United States Patent Office 3,467,677
Patented Sept. 16, 1969

3,467,677
17α-OXA-D-HOMO-PREGNANES AND METHODS
FOR THEIR MANUFACTURE
John N. Gardner, South Mountain Pass, Garrison, N.Y.,
assignor to Schering Corporation, Bloomfield, N.J., a
corporation of New Jersey
No Drawing. Filed Apr. 21, 1967, Ser. No. 632,521
Int. Cl. C07d 101/00; C07c 169/34
U.S. Cl. 260—345.2          15 Claims

ABSTRACT OF THE DISCLOSURE

Described herein are novel 3-oxygenated-16-methyl-17a - oxa - D - homo - 16-pregnenes and 3-oxygenated-16-methyl - 17 - hydroxy-17a-oxa-D-homo-pregnanes and 17-alkyl ethers thereof which have anti-androgenic properties.

Also described are methods for the preparation of the above-mentioned 16-methyl-17a-oxa - D - homopregnanes which comprise treating a 16β-methyl-17α-hydroperoxy-20-keto-pregnane with a strong acid or under non-acidic esterifying conditions whereby is formed a product mixture containing the above-mentioned 16-dehydro and 17 - hydroxy - 16 - methyl - 17a - oxa-D-homopregnane derivatives; and when a lower alkanol is added to the reaction mixture there is also formed the corresponding 17-alkoxy derivatives of the 17-hydroxy-16-methyl-17a-oxa-D-homopregnanes.

BACKGROUND AND SUMMARY OF THE INVENTION

Field of the invention

This invention relates to new and useful compositions of matter classifiable in the field of organic chemistry as 17a-oxa-D-homosteroids. More particularly, this invention relates to novel 16-methyl-17a-oxa-D-homo-pregnanes and to methods for preparing same.

The invention sought to be patented in its composition aspect is described as residing in the concept of a novel chemical compound having a 16-methyl-17a-oxa-D-homo-pregnane-20-one nucleus and also having either a double bond at C–16, or a hydroxy group or lower alkyl ether thereof at C–17, said 17a-oxa-D-homo pregnane being further characterized by having an oxygenated function at C–3 selected from the group consisting of ketonic oxygen, (H, βOH) and (H, αOH). The tangible embodiments of the instant invention may be unsaturated in the A and/or B rings and may also possess substituents at C–6, C–9, C–11 and C–16.

The process aspect of this invention is described as residing in the concept of treating a 16β-methyl-17α-hydroperoxy-20-keto-pregnane with a strong acid or under non-acidic esterifying conditions whereby fission of the carbon-carbon bond between C–13 and C–17 occurs followed by the formation of a carbon-oxygen bond giving rise to a 16-methyl-17a-oxa-D-homo-17-acetyl carbonium ion in situ which under the reaction conditions, i.e. in the presence of a strong acid or under non-acidic esterifying conditions, converts to form a mixture comprising 16-methyl-17a-oxa-D-homo-16-pregnene-20-one and 16β-methyl-17a-oxa-D-homo-pregnane-17-ol. When alcohol is added to the reaction mixture there is also formed the 17-alkoxy derivatives of this invention.

This invention is based upon the discovery that the tangible embodiments of the composition aspect of my invention disclosed hereinabove are the products of the aforementioned rearrangement process aspect of my invention and that the products, i.e. 16-methyl-17a-oxa-D-homo - pregnane - 20 - ones are anti-androgenic in their physiological action when administered to warm blooded animals and specifically when administered to rats and dogs.

Description of the invention

The novel compounds sought to be patented may be represented as a member selected from the group consisting of 16-methyl-17a-oxa-D-homo-pregnane-20-ones of the following structural formulae:

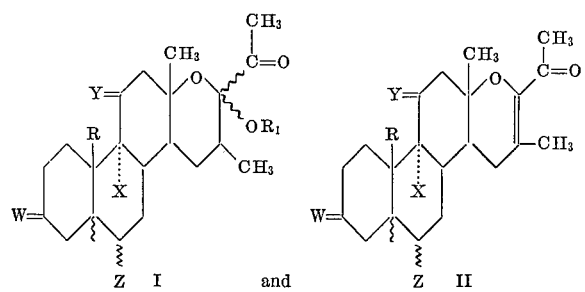

wherein R is a member selected from the group consisting of hydrogen and methyl; $R_1$ is a member selected from the group consisting of hydrogen and lower alkyl when $OR_1$ is β-oriented, and lower alkyl when $OR_1$ is α-oriented; W is a member selected from the group consisting of (oxygen), (H, αOV), (H, βOV), V being a member selected from the group consisting of hydrogen and hydrocarbon carbonyl having up to eight carbon atoms; X is a member selected from the group consisting of hydrogen and halogen having an atomic weight less than 126; Y is a member selected from the group consisting of oxygen, (H, αOH), (H, βOH), hydrogen provided X is hydrogen, and (H, βCl) provided X is chlorine; Z is a member selected from the group consisting of hydrogen, methyl, fluorine and chlorine; and the 1-dehydro, 4-dehydro, 5-dehydro, 1,4-bis-dehydro and the 1,5-bis-dehydro analogs thereof.

As used herein the term lower alkyl denotes hydrocarbon radicals of one to five carbon atoms inclusive of the branched chain isomers. Exemplary of the foregoing are such lower alkyl groups as methyl, ethyl, propyl, isopropyl, butyl, isobutyl and the like. The preferred lower alkyl groups are methyl and ethyl. The hydrocarbon carboxylic acid esters contemplated at C–3 are derived from alkanoic acids such as acetic, propionic, butyric, valeric and isobutyric acids; from alkenoic acids such as butenoic and allylacetic; from alkynoic acids such as propiolic; from aryl, alkaryl and aralkyl carboxylic acids such as benzoic, toluic, and phenylacetic acids respectively.

The use of a wavy line to designate the bonds at C–17 of the Formula I tangible embodiments indicates that both isomeric forms at C–17 (i.e. 17α and 17β-alkoxy-D-homo-pregnanes and 17β-hydroxy-D-homo-iso-pregnanes) are included in the composition aspect of this invention. In this application, when a compound name does not specifically indicate the configuration at C–17, both isomeric forms are implicitly included. Thus, the compound name 16β - methyl - 17a - oxa - 5α - D - homo - pregnane-17-ol-3,20-dione 17-methyl ether includes both the 17α-methoxypregnane and the 17β-methoxy-17-iso-pregnane isomers i.e. 16β - methyl - 17a - oxa-5a-D-homo-pregnane-17α-ol-3,20-dione 17-methyl ether and 16β-methyl-17a-oxa-5α-D-homo-isopregnane-17β-ol-3,20-dione 17-methyl ether.

Similarly, the use of the wavy line to designate the bonds at C–5 and C–6 of the Formulae I and II tangible embodiments indicates that both isomeric forms at C–5 and C–6 are included in the composition aspects of this invention. As an example of the foregoing, 16β-methyl-17a-oxa-D-homo-pregnane-3,20-dione includes both the 5α-(allo) and the 5β-(normal) isomers. Substituents at C-6 may in like manner be either α- or β-oriented and when the name of the compound does not specify an isomer, both isomeric forms are implicity included. Thus the compound name 16β-methyl-6-fluoro-17a-oxa-D-homo-pregnane-17-ol-3,20-dione 17-ethyl ether includes both the 5α-(allo) and 5β-(normal) configurations; the 6α- and 6β-fluoro substituents and the 17α- and 17β-ethoxy isomers and combinations thereof.

Included among the tangible embodiments of this invention are such compounds as the following:

16β-methyl-17a-oxa-D-homo-5α-pregnane-17α-ol-3,20-dione 17-methyl ether,
16β-methyl-17a-oxa-D-homo-5α-isopregnane-17β-ol-3,20-dione,
16β-methyl-17a-oxa-D-homo-5α-isopregnane-3β,17β-diol-20-one 17-methyl ether,
16β-methyl-17a-oxa-17-iso-D-homo-4-pregnene-17β-ol-3,20-dione,
16-methyl-17a-oxa-D-homo-5α-pregnane-3β,16,17-triol-20-one,
6,16-dimethyl-17a-oxa-D-homo-5,16-pregnadiene-3β-ol-20-one 3-acetate,
6,16β-dimethyl-17a-oxa-17-iso-D-homo-5-pregnene-3β,17β-diol-20-one 3-acetate, and
16-methyl-17a-oxa-D-homo-4,16-pregnadiene-3,20-dione.

PREFERRED EMBODIMENTS OF COMPOSITION ASPECTS OF INVENTION

The preferred embodiments of the composition aspect of my invention are those having a 17-oxygenated function, e.g. 16β-methyl-17a-oxa-D-homo-pregnane-17α-ol-3,20-dione 17-methyl ether, 16β-methyl-17a-oxa-17-iso-D-homo-pregnane-17β-ol-3,20-dione and its 17-methyl ether and the like. The 17-oxygenated compounds usually possess a higher degree of physiological activity than their 16-dehydro analogs. Additionally, the 17α-alkoxy compounds are capable of being converted to the corresponding 17β-alkoxy isomers thereof.

DESCRIPTION OF THE PROCESS ASPECT OF THE INVENTION

By the process aspects of this invention a 16β-methyl-17α-hydroperoxy pregnane upon treatment with a strong acid or under non-acidic esterifying conditions is transformed first into a 16-methyl-17a-oxa-D-homo-17-acetyl carbonium ion in situ. This ion in turn is converted into a mixture of products comprising predominantly a 16-methyl-16-dehydro-17a-oxa-D-homopregnane of Formula II together with a 16β-methyl-17β-hydroxy-17a-oxa-D-homopregnane of Formula I. When a lower alkanol is added to the reaction mixture there are also formed 17-alkoxy derivatives of Formula I, i.e. both the α and β isomers, thus producing 17α-alkoxy-17a-oxa-D-homo-pregnanes and 17β-alkoxy-17a-oxa-D-homo-iso-pregnanes of this invention.

The physical embodiments of the process aspects of my invention which are carried out under strongly acidic or under non-acidic esterifying conditions include those carried out under strongly acidic non-esterifying conditions (such as that utilizing perchloric acid in dioxane), those carried out under strongly acidic esterifying conditions (e.g. p-toluenesulfonic acid and isopropenyl acetate in acetic acid) and those carried out under non-acidic esterifying conditions (such as acetic anhydride in pyridine). The preferred process is the one employing the non-acidic esterifying conditions.

The 17α-hydroperoxy starting compounds for my processes are, in general, known. They may be prepared by procedures described in the art, such as by reacting an enol form of a 17-desoxy-20-keto pregnane with molecular oxygen under alkaline conditions.

A typical example of a preferred embodiment of this process is set forth below in general terms. A 16β-methyl-17α-hydroperoxy-20-keto pregnane, e.g. 16β-methyl-17α-hydroperoxy-5α-pregnane-3,20-dione is dissolved in a suitable tertiary amine, e.g. pyridine to which a stoichiometric excess of a lower alkanoyl anhydride, chloride, or bromide, e.g. acetic anhydride, is added. The mixture is allowed to react over night (18 hours) at about room temperature and is then treated with an aqueous-alcoholic solution of strong base (potassium hydroxide) for about 1 hour in an inert atmosphere. Isolation of the product is effected by precipitation yielding a mixture of tangible embodiments, e.g. 16-methyl-16-dehydro-17a-oxa-D-homopregnene, 16β-methyl-17β-hydroxy-17a-oxa-D-homopregnane, and 16β-methyl-17-methoxy-17a-oxa-D-homopregnane and purification of the tangible embodiments effected by techniques known in the art such as fractional crystallization, partition chromatography on diatomaceous earth, such as, Chromosorb® (Johns-Mansville) or other suitable support using ligroin saturated with propylene glycol or another effective solvent system as the mobile phase. The mixture of products obtained in this manner are depicted in Formulae I and II hereinabove and in which under the conditions recited above the embodiments depicted by Formula II predominate.

Strongly acidic non-esterifying conditions as used herein denote an essentially anhydrous solution of a mineral acid or of an oxygenated sulfur containing acid, e.g. sulfinic, sulfonic, sulfuric and sulfurous acids. These acids are usually employed in conjunction with non-hydroxylic, water miscible, essentially neutral, organic solvents, such as dioxane and tetrahydrofuran. The choice of solvent is frequently dictated by the solubility of the specific 17α-hydroperoxide starting material employed. In general, however, dioxane in combination with perchloric acid is preferred. The hydroperoxide, e.g. 6,16β-dimethyl-17α-hydroperoxy-5-pregnene-3β-ol-20-one, is dissolved in a suitable solvent (dioxane), a small amount of 70% perchloric acid added and the reaction mixture left overnight (18 hours) at room temperature. The isolation and separation of the products is effected in substantially the same manner as from the esterification medium. Again the 6,16-dimethyl-17a-oxa-D-homo-5,16-pregnadiene-3β-ol-20-one (Formula II embodiment) predominates, however, the 6,16β-dimethyl-17a-oxa-D-homo-5-pregnene-3β,17β-diol-20-one (17-oxygenated analog) (Formula I) is concomitantly obtained.

Exemplary of the third medium in which the instant invention may be performed, i.e. esterifying conditions which are strongly acidic, are such as that utilizing isopropenyl acetate, for example, in combination with a strong acid (p-toluenesulfonic acid) in an alkanoic (acetic) acid solvent. The choice of strong acid does not appear to be critical, however, the medium should be essentially anhydrous. The process is carried out in essentially the same manner as the two described above and the product contains a preponderance of the Formula II embodiment.

The processes described generally above will be more fully shown in the examples.

As previously stated, the tangible embodiments of this invention are anti-androgens. As defined herein the term anti-androgen is used to designate compounds and pharmaceutical formulations thereof, which cause a reduction or remission of disorders caused or aggravated by androgens. Benign prostatic hypertrophy is such a disorder and is one with which domestic animals, especially dogs, become afflicted. The tangible embodiments of this invention are effective in treating such an affliction. They may be employed in capsules, tablets and elixirs for oral administration. They may also be employed in the form of injectables and in either case may be compounded with pharmaceutically acceptable excipients. These compounds may also be used in the form of suppositories which may additionally contain local anesthetics.

The following examples are set forth to describe the best mode contemplated for carrying out this invention and are not to be construed as limiting the scope thereof.

EXAMPLE 1A

6,16-dimethyl-17a-oxa-D-homo-5,16-pregnadiene-3β-ol-20-one 3-acetate

Dissolve 3.1 g. of 6,16-dimethyl-17α-hydroperoxy-5-pregnen-3β-ol-20-one in a mixture of 20 ml. of pyridine and 5 ml. of acetic anhydride at room temperature and with stirring. Allow the reaction mixture to stir for approximately 18 hours at room temperature. Precipitate the product by slowly pouring the reaction mixture into ice water with vigorous stirring. Collect the product on a filter and wash it with copious quantities of water. Crystallize the product from aqueous methanol and obtain 1.03 g. 6,16-dimethyl - 17a - oxa-D-homo-5,16-pregnadiene-3β-ol-20-one 3-acetate having the following properties: M.P. 180–183° C. $[\alpha]_D^{25°} = -169°$, $\lambda_{max}$ 278 mµ ($\epsilon = 6,200$).

Treat the following 17α-hydroperoxy steroids in the manner described above:

16β-methyl-17α-hydroperoxy-5α-pregnane-3β-ol-20-one 3-acetate
16β-methyl-17α-hydroperoxy-5-pregnene-3β-ol-20-one 3-acetate
16β-methyl-17α-hydroperoxy-4-pregnene-3,20-dione
16β-methyl-17α-hydroperoxy-1,4-pregnadiene-11α-ol-3,20-dione
6α,16β-dimethyl-17α-hydroperoxy-4-pregnene-3,20-dione
16β-methyl-17α-hydroperoxy-5α-pregnane-3β-ol-11,20-dione
16β-methyl-17α-hydroperoxy-6α-fluoro-5-pregnene-3β-ol-20-one
16β-methyl-17α-hydroperoxy-pregnane-3,11,20-trione
16β-methyl-17α-hydroperoxy-5α-pregnane-3,11,20-trione
16β-methyl-17α-hydroperoxy-pregnane-3α-ol-20-one 3-acetate
16β-methyl-17α-hydroperoxy-1,4-pregnadiene-11β-ol-3,20-dione and
16β-methyl-17α-hydroperoxy-9α,11β-dichloro-4-pregnene-3,20-dione.

The compounds listed above, upon reaction under the conditions of Example 1A yield respectively the following products:

16-methyl-17a-oxa-D-homo-16,5α-pregnene-3β-ol-20-one 3-acetate
16-methyl-17a-oxa-D-homo-5,16-pregnadiene-3β-ol-20-one 3-acetate
16-methyl-17a-oxa-D-homo-4,16-pregnadiene-3,20-dione
16-methyl-17a-oxa-D-homo-1,4,16-pregnatriene-11α-ol-3,20-dione 11-acetate
6α,16-dimethyl-17a-oxa-D-homo-4,16-pregnadiene-3,20-dione
16-methyl-17a-oxa-5α,16-pregnene-3β-ol-11,20-dione 3-acetate
16-methyl-17a-oxa-D-homo-6α-fluoro-5,16-pregnadiene-3β-ol-20-one 3-acetate
16-methyl-17a-oxa-D-homo-16-pregnene-3,11,20-trione
16-methyl-17a-oxa-D-homo-5α,16-pregnene-3,11,20-trione
16-methyl-17a-oxa-D-homo-16-pregnene-3β-ol-20-one 3-acetate
16-methyl-17a-oxa-D-homo-1,4,16-pregnatriene-11β-ol-3,20-dione and
16-methyl-17a-oxa-D-homo-9α,11β-dichloro-4,16-pregnadiene-3,20-dione.

EXAMPLE 1B

6,16β-dimethyl-17a-oxa-D-homo-17-iso-5-pregnene-3β,17β-diol-20-one 3-acetate Treat the aqueous methanol filtrates from Example 1A containing approximately 2 g. of solids with excess potassium hydroxide at room temperature for 2 hours under a nitrogen atmosphere. Neutralize the reaction mixture with acetic acid and dilute the mixture with 5 volumes of water per volume of reaction mixture. Extract the diluted mixture with ethyl acetate and wash the extracts with water. Dry the extracts over sodium sulfate and concentrate under reduced pressure to a residue. Dissolve the residue in a small volume (25 ml.) of propylene glycol and chromatograph on a previously prepared column containing 140 g. of Chromosorb® suspended in propylene glycol saturated with ligroin. Develop the column with ligroin saturated with propylene glycol; collect 50 ml. fractions and monitor the effluent by paper chromatographing a portion of each using the same system being used in the column. Combine the fractions containing materials of like mobility, fractions 53–72 contain the title product as the 3β-ol. Concentrate the combined fractions under reduced pressure to a residue and redissolve in pyridine and add a molar excess of acetic anhydride to the solution obtained. Allow the reaction mixture to stand overnight (18 hours) and precipitate into water. Water wash and dry the product and crystallize from aqueous ethanol to obtain 6,16-dimethyl-17a-oxa-D-homo-17 - iso - 5-pregnene-3β,17β-diol-20-one 3-acetate; which melts at 149–153° C.

EXAMPLE 2

16-methyl-17a-oxa-D-homo-5α,16-pregnene-3β-ol-20-one

Dissolve 1.22 g. of 17α-hydroperoxy-16β-methyl-5α-pregnane-3β-ol-20-one 3-acetate in a mixture of 7 ml. of pyridine and 3.5 ml. of acetic anhydride. Permit the resulting solution to stand at room temperature for 18 hours. Pour the solution into 5 volumes (50 ml.) of water and extract the product with ethyl acetate. Evaporate the extract to a residue under reduced pressure and dissolve the residue in methanol. With stirring and under a nitrogen atmosphere, add a solution of 2 N potassium hydroxide to the methanolic solution until it becomes strongly basic (pH 12). Allow the reaction to proceed for 1 hour under the inert atmosphere, then precipitate by the addition of water.

Filter, water wash, and dry the resultant precipitate comprising 16 - methyl-17a-oxa-D-homo-5α,16-pregnene-3β-ol-20-one.

Purify by chromatography on Chromosorb® (100 g.) using the ligroin-propylene glycol system described above. Collect 30 ml. fractions and combine the fractions containing like products as determined by thin layer chromatography of an aliquot of each fraction. Fractions 32–64 contain the title product whose physical constants are as follows: M.P. 159°–162° C. $[\alpha]_D^{25°} = -79.5°$ dioxane, and a polymorphic form M.P. 128–132°, said polymorph being convertible into the higher melting form.

By employing the process of Example 2, the following 17α-hydroperoxy pregnanes are converted to their corresponding 17a-oxa-D-homo-16-pregnene analogs:

16β-methyl-17α-hydroperoxy-5-pregnene-3β-ol-20-one 3-acetate
16β-methyl-17α-hydroperoxy-4-pregnene-3,20-dione
16β-methyl-17α-hydroperoxy-1,4-pregnadiene-11α-ol-3,20-dione
6α,16β-dimethyl-17α-hydroperoxy-4-pregnene-3,20-dione
16β-methyl-17α-hydroperoxy-5α-pregnane-3β-ol-11,20-dione
16β-methyl-17α-hydroperoxy-6α-fluoro-1,4-pregnadiene-3,20-dione
16β-methyl-17α-hydroperoxy-pregnane-3,11,20-trione
16β-methyl-17α-hydroperoxy-5α-pregnane-3,11,20-trione
16β-methyl-17α-hydroperoxy-pregnane-3α-ol-20-one 3-acetate
16β-methyl-17α-hydroperoxy-1,4-pregnadiene-11β-ol-3,20-dione, and
16β-methyl-17α-hydroperoxy-9α,11β-dichloro-4-pregnene-3,20-dione.

The starting compounds listed above, upon treatment by the process of Example 2, yield the products set forth below:

16-methyl-17a-oxa-D-homo-5,16-pregnadiene-3β-ol-20-one
16-methyl-17a-oxa-D-homo-4,16-pregnadiene-3,20-dione
16-methyl-17a-oxa-D-homo-1,4,16-pregnatriene-11α-ol-3,20-dione
6α,16-dimethyl-17a-oxa-D-homo-4,16-pregnadiene-3,20-dione
16-methyl-17a-oxa-D-homo-5α,16-pregnene-3β-ol-11,20-dione
16-methyl-17a-oxa-D-homo-6α-fluoro-1,4,16-pregnatriene-3,20-dione
16-methyl-17a-oxa-4-homo-16-pregnene-3,11,20-trione
16-methyl-17a-oxa-D-homo-5α,16-pregnene-3,11,20-trione
16-methyl-17a-oxa-D-homo-16-pregnene-3α-ol-20-one
16-methyl-17a-oxa-D-homo-1,4,16-pregnatriene-11β-ol-3,20-dione, and
16-methyl-17a-oxa-D-homo-9α,11β-dichloro-4,16-pregna-17α-methoxy-16β-methyl-17a-oxa-D-homo-5α-

EXAMPLE 3A

17α-methoxy-16β-methyl-17a-oxa-D-homo-5α-pregnane-3β-ol-20-one

Repeat Example 2 but decrease the acetic anhydride from 3.5 ml. to 610 mgs. Isolate the resultant product in a manner similar to that described in Example 2. Fractions 23 to 32 afford the title product whose physical constants are as follows: M.P. 142°–145° C. and $[\alpha]_D^{25°}=-30°$ (dioxane).

In a manner similar to that of this example, treat each of the starting materials enumerated in Example 2 and isolate the respective resultant products in a manner similar to that described to obtain:

17α-methoxy-16β-methyl-17a-oxa-D-homo-5-pregnene-3β-ol-20-one
17α-methoxy-16β-methyl-17a-oxa-D-homo-4-pregnene-3,20-dione
17α-methoxy-16β-methyl-17a-oxa-D-homo-1,4-pregnadiene-11α-ol-3,20-dione
17α-methoxy-6α,16β-dimethyl-17a-oxa-D-homo-4-pregnene-3,20-dione
17α-methoxy-16β-methyl-17a-oxa-D-homo-5α-pregnane-3β-ol-11,20-dione
17α-methoxy-16β-methyl-6α-fluoro-17a-oxa-D-homo-1,4-pregnadiene-3,20-dione
17α-methoxy-16β-methyl-17a-oxa-D-homo-pregnane-3,11,20-trione
17α-methoxy-16β-methyl-17a-oxa-D-homo-5α-pregnane-3,11,20-trione
17α-methoxy-16β-methyl-17a-oxa-D-homo-pregnane-3α-ol-20-one
17α-methoxy-16β-methyl-17a-oxa-D-homo-1,4-pregnadiene-11β-ol-3,20-dione, and
17α-methoxy-16β-methyl-17a-oxa-D-homo-9α,11β-dichloro-4-pregnene-3,20-dione, respectively.

EXAMPLE 3B 16-methyl-17a-oxa-D-homo-5α,16-pregnene-3β-ol-20-one

Continue to elute the column from Example 3A above with the ligroin-propylene glycol eluant used therein. Combine fractions 38 to 54 and obtain the title product having the same physical constants as the identical product prepared in Example 2 above.

In similar manner, by utilizing the process of Example 3B on the starting materials enumerated in Example 2, by removing the 17α-methoxy product from the column, and by continuing to elute the column the corresponding 16-methyl-17a-D-homo-16-pregnenes are obtained.

EXAMPLE 3C

16β-methyl-17a-oxa-D-homo-5α,17-isopregnane-3β,17β-diol-20-one

Continue to elute the column from Example 3B further and obtain from fractions 67 to 78 the title product of this example whose physical constants are as follows: M.P. 173–178° C. $[\alpha]_D^{25}=-42.5°$, c.=dioxane, and a polymorph melting at 130°–150° C.

Similarly, by the utilization of the process of this example on the starting material enumerated after Example 2 the following product may be obtained:

16β-methyl-17a-oxa-D-homo-17-iso-5-pregnene-3β,17β-diol-20-one
16β-methyl-17a-oxa-D-homo-17-iso-4-pregnene-17β-ol-3,20-dione
16β-methyl-17a-oxa-D-homo-17-iso-1,4-pregnadiene-11α,17β-diol-3,20-dione
6α,16β-dimethyl-17a-oxa-D-homo-17-iso-4-pregnene-17β-ol-3,20-dione
16β-methyl-17a-oxa-D-homo-17-iso-5α-pregnane-3β,17β-diol-11,20-dione
16β-methyl-17a-oxa-D-homo-6α-fluoro-17-iso-1,5-pregnadiene-17β-ol-3,20-dione
16β-methyl-17a-oxa-D-homo-17-isopregnane-17β-ol-3,11,20-trione
16β-methyl-17a-oxa-D-homo-17-iso-5α-pregnane-17β-ol-3,11,20-trione
16β-methyl-17a-oxa-D-homo-17-isopregnane-3β,17β-diol-20-one
16β-methyl-17a-oxa-D-homo-17-iso-1,4-pregnadiene-11β,17β-diol-3,20-dione and
16β-methyl-17a-oxa-D-homo-9α,11β-dichloro-17-iso-4-pregnene-17β-ol-3,20-dione, respectively.

EXAMPLE 4

16-methyl-17a-oxa-D-homo-5α,16-pregnene-3β-ol-20-one

Suspend 3 gms. of 16β-methyl-17α-hydroperoxy-5α-pregnane-3β-ol-20-one in 80 ml. of dioxane and 8 ml. of 70% perchloric acid. Stir the mixture at room temperature for 18 hours and precipitate the product by the addition of 80 ml. of water. Dissolve the product in 100 ml. of methanol and blanket the reaction mixture with nitrogen. Add an aqueous solution of 2 N sodium hydroxide to the reaction mixture with stirring until the solution is strongly basic (pH 12). Stir the reaction mixture for 2 hours at room temperature. Neutralize the reaction mixture with acetic acid and dilute the neutral solution with water to approximately 3 times its pre-dilution volume. Extract the mixture with ethyl acetate and wash the extracts with water. Dry the ethyl acetate solution over anhydrous sodium sulfate and concentrate the dried solution to a residue using the procedure of Example 1B and obtain from fractions 20 to 40, 1.02 gms. of 16-methyl-17a - oxa - D-homo-5α,16-pregnene-3β-ol-20-one whose physical constants are as follows: M.P. 159–162° C. $[\alpha]_D^{25}=-79.5°$, $\lambda_{max}$ 278 mμ ($\epsilon=5,900$).

EXAMPLE 5

16β-methyl-17β-methoxy-17a-oxa-D-homo-5α,17-isopregnane-3β-ol

Dissolve 88 mg. of 16β-methyl-17α-methoxy-17a-oxa-D-homo-5α-pregnane-3β-ol-20-one in 6 ml. of methanol containing 5–10 drops of acetic acid. Warm the mixture on a steam bath for 3 hours and add enough water (5–20 ml.) to precipitate the product. Dry the precipitate at 60° C. and crystallize the dried product from a mixture of acetone-hexane to yield 45 mg. of the title product whose melting point and rotation are as follows: M.P. 180°–192° C. $[\alpha]_D=-110°$.

In a similar manner by treating other 16β-methyl-17α-alkoxy-17a-oxa-D-homo-pregnanes with methanol and acetic acid in a manner substantially as described above, there is obtained the corresponding 17β-alkoxy-17-isopregnane isomers thereof.

Exemplary of the foregoing, the following 16β-methyl-17α-alkoxy-17a-oxa-D-homo-pregnanes may be employed in the process of this example:

(1) 16β-methyl-17α-ethoxy-17a-oxa-D-homo-5α-pregnane-3,20-dione
(2) 16β-methyl-17α-propoxy-17a-oxa-D-homo-4-pregnene-3,11,20-trione
(3) 16β-methyl-17α-methoxy-17a-oxa-D-homo-1,4-pregnadiene-11β-ol-3,20-dione
(4) 6α,16β-dimethyl-17α-butoxy-17a-oxa-D-homo-4-pregnene-3,20-dione
(5) 16β-methyl-17α-isopropoxy-17a-oxa-D-homo-5-pregnene-3β-ol-20-one
(6) 16β-methyl-17α-methoxy-17a-oxa-D-homo-4,6-pregnadiene-3,20-dione
(7) 16β-methyl-17α-ethoxy-17a-oxa-D-homo-9α,11β-dichloro-4-pregnene-3,20-dione
(8) 16β-methyl-17α-propoxy-17a-oxa-D-homo-6α,9α-difluoro-1,4-pregnadiene-11β-ol-3,20-dione
(9) 16β-methyl-17α-methoxy-17a-oxa-D-homo-6α-chloro-4,6-pregnadiene-11β-ol-3,20-dione, and
(10) 6α,16β-dimethyl-17α-ethoxy-17a-oxa-D-homo-9α-fluoro-1,4-pregnadiene-11β-ol-3,20-dione.

Isolate the respective resultant products in a manner similar to that described in Example 5 to obtain respectively:

(1) 16β-methyl-17β-ethoxy-17a-oxa-D-homo-5α,17-isopregnane-3,20-dione
(2) 16β-methyl-17β-propoxy-17a-oxa-D-homo-4,17-isopregnene-3,11,20-trione
(3) 16β-methyl-17β-methoxy-17a-oxa-D-homo-1,4,17-isopregnadiene-11β-ol-3,20-dione
(4) 6α,16β-dimethyl-17β-butoxy-17a-oxa-D-homo-4,17-isopregnene-3,20-dione
(5) 16β-methyl-17β-isopropoxy-17a-oxa-D-homo-5,17-isopregnene-3β-ol-20-one
(6) 16β-methyl-17β-methoxy-17a-oxa-D-homo-4,6,17-isopregnadiene-3,20-dione
(7) 16β-methyl-17β-ethoxy-9α,11β-dichloro-17a-oxa-D-homo-4,17-isopregnene-3,20-dione
(8) 16β-methyl-17β-propoxy-6α,9α-difluoro-17a-oxa-D-homo-1,4,17-isopregnadiene-11β-ol-3,20-dione
(9) 16β-methyl-17β-methoxy-6α-chloro-17a-oxa-D-homo-4,6,17-isopregnadiene-11β-ol-3,20-dione, and
(10) 6α,16β-dimethyl-17β-ethoxy-9α-fluoro-17a-oxa-D-homo-1,4,17-isopregnadiene-11β-ol-3,20-dione.

EXAMPLE 6

16-methyl-17a-oxa-D-homo-5α,16-pregnene-3β-ol-20-one

Suspend 5.2 gms. of 16β-methyl-17α-hydroperoxy-5α-pregnane-3β-ol-20-one in 150 ml. of acetic acid and add 20 ml. of isopropenyl acetate. Add 520 mg. of p-toluenesulfonic acid and stir the resulting mixture for 18–20 hours at room temperature. Dilute the reaction mixture with approximately 3 volumes (500 ml.) of water and extract with ethyl acetate. Concentrate the extracts to a residue in vacuo and dissolve the residue in methanol. Blanket the methanolic solution with argon and add 2 N potassium hydroxide to a pH of about 12. Stir the solution at room temperature for 1 hour while maintaining an argon atmosphere. Precipitate the product by adding water to the methanolic solution, filter the suspension and dry the solid product. Chromatograph the dried product on 400 gms. of Chromosorb® using the method described in Example 2 obtaining thereby 4.05 gms. of 16-methyl-17a-oxa-D-homo-5α,16-pregnene-3β-ol-20-one.

Similarly, the foregoing procedure may be employed on other starting materials of which the following are exemplary:

16β-methyl-17α-hydroperoxy-4-pregnene-3,20-dione
16β-methyl-17α-hydroperoxy-1,4-pregnadiene-11α-ol-3,20-dione
6α,16β-dimethyl-17α-hydroperoxy-4-pregnene-3,20-dione
16β-methyl-17α-hydroperoxy-5α-pregnane-3β-ol-11,20-dione
16β-methyl-17α-hydroperoxy-6α-fluoro-1,5-pregnadiene-3β-ol-20-one, and
16β-methyl-17α-hydroperoxy-pregnane-3,11,20-trione.

By employing the procedure of Example 5 on the compounds just enumerated the following products may be obtained:

16-methyl-17a-oxa-D-homo-4,16-pregnadiene-3,20-dione
16-methyl-17a-oxa-D-homo-1,4,16-pregnatriene-11α-ol-3,20-dione
6α,16-dimethyl-17a-oxa-D-homo-4,16-pregnadiene-3-20-dione
16-methyl-17a-oxa-D-homo-5α,16-pregnene-3β-ol-11,20-dione
16-methyl-17a-oxa-D-homo-6α-fluoro-1,5,16-pregnatriene-3β-ol-20-one, and
16-methyl-17a-oxa-D-homo-16-pregnene-3,11,20-trione.

EXAMPLE 7

16-methyl-17a-oxa-D-homo-5α,16-pregnene-3β-ol-20-one

Dissolve 100 mgs. of 16β-methyl-17a-oxa-D-homo-17-isopregnane-3β,17β-diol-20-one in 20 ml. of methanol. Add a few (5–15) drops of 2 N hydrochloric acid to the solution and maintain at about 25° C. for 48 hours. Precipitate the product by the addition of water and chromatograph the dried precipitate on Chromosorb® (250 grams) using ligroin saturated with propylene glycol as the eluent and monitor the effluent by chromatographing on paper a portion (0.1 ml.) of each (10 ml.) fraction. Combine the fractions of similar mobility as determined by spraying the dried paper with a methanol-phosphomolybdic acid spray and measuring the $R_f$ of the spots that appear on heating. Isolate the product as described in Example 2 to obtain the title compound which after crystallization from acetone-hexane melts 159°–162° C. has an $[\alpha]_D = -79.5°$ and a $\lambda_{max}$ at 278 mμ (ε 5,900).

EXAMPLE 8

6α,16-dimethyl-17a-oxa-D-homo-5α,16-pregnane-3β-ol-20-one

Dissolve 630 mgs. of 6α,16β-dimethyl-17a-oxa-D-homo-5α-pregnane-3β,17α-diol-20-one 17-methyl ether in 80 ml. of tetrahydrofuran and about 1.0 ml. of 2 N hydrochloric acid and warm the solution on the steam bath for about one hour. Precipitate the product by the addition of water to the reaction mixture and crystallize the precipitate from acetone-hexane to obtain the title product.

EXAMPLE 9

16-methyl-17a-oxa-D-homo-5α-pregnane-3β,16,17-triol-20-one

Dissolve 717 mg. of 16-methyl-17a-oxa-D-homo-5α,16-pregnene-3β-ol-20-one in 30 ml. of ethyl ether and 1 ml. of pyridine. Prepare a solution of 500 mg. of osmium tetroxide in 15 ml. of ethyl ether. Mix the two solutions and store the mixture in the dark at room temperature for 3 days. Collect the precipitated product by filtration and wash with ethyl ether. Dissolve the product in 125 ml. of ethanol and add 100 ml. of a 2% sodium metabisulphite solution. Reflux the mixture for about 1½ hours, filter the suspension and remove the greater part of the ethanol by distillation. Cool the mixture and extract the product with ethyl acetate. Concentrate the ethyl acetate extracts to a residue and crystallize from aqueous ethanol to yield the title product with the following physical constants: M.P. 166°–177° C. [α]_D=87°

I claim:

1. A compound selected from the group consisting of steroids having the formulae:

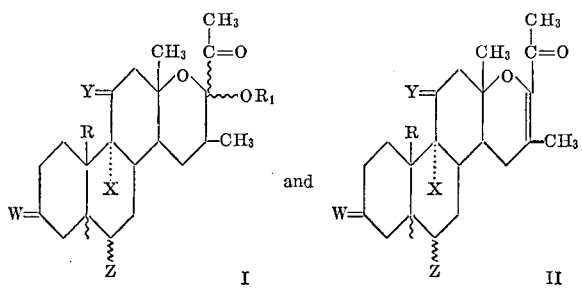

wherein R is a member selected from the group consisting of hydrogen and methyl; R₁ is a member selected from the group consisting of hydrogen and lower alkyl when OR₁ is β-oriented, and lower alkyl when OR₁ is α-oriented; W is a member selected from the group consisting of oxygen, (H, αOV) and (H, βOV), V being a member selected from the group consisting of hydrogen and lower alkanoyl; X is a member selected from the group consisting of hydrogen and halogen having an atomic weight less than 126; Y is a member selected from the group consisting of oxygen, (H, βOH), (H, βOH), hydrogen provided X is hydrogen, and (H, βCl) provided X is chlorine; Z is a member selected from the group consisting of hydrogen, methyl, fluorine and chlorine; and the 1-dehydro, 4-dehydro, 5-dehydro, 1-4-bis-dehydro and the 1,5-bis-dehydro analogs thereof.

2. 16β - methyl - 17a - oxa - D - homo - 5α - pregnane-17α - ol - 3,20 - dione 17-methyl ether.

3. 16β - methyl - 17a - oxa - D - homo - 5α,17 - isopregnane - 17β - ol-3,20-dione 17-methyl ether.

4. 16β - methyl - 17a - oxa - D - homo - 5α,17-isopregnane-3β,17β-diol-20-one 3-acetate.

5. 16 - methyl -17a - oxa - D - homo-4,16-pregnadiene-3,20-dione.

6. 16β - methyl - 17a - oxa - D - homo-4,17-iso-pregnene-17β-ol-3,20-dione 17-methyl ether.

7. 16β - methyl - 17a - oxa - D - homo-5-pregnene-3β,17α-diol-20-one 17-methyl ether.

8. A process for preparing the 16-dehydro and 17-hydroxy compounds of claim 1 which comprises treating a 3 - oxygenated - 16β - methyl - 17α - hydroperoxy pregnane-20-one in a tertiary amine with a member selected from the group consisting of a lower alkanoyl anhydride, a lower alkanoyl chloride, and a lower alkanoyl bromide.

9. A process according to claim 8 wherein said tertiary amine is pyridine and said lower alkanoyl anhydride is acetic anhydride.

10. A process for preparing the compounds of claim 1 which comprises treating a 3 - oxygenated -16β - methyl-17α - hydroperoxy - pregnane - 20-one in a tertiary amine with a member selected from the group consisting of a lower alkanoyl anhydride, a lower alkanoyl chloride, and a lower alkanoyl bromide; followed by treating the thereby formed 16-dehydro and the 17-hydroxy compounds of claim 1 with an alkali in aqueous lower alkanol in an inert atmosphere.

11. A process for preparing the 16-dehydro and the 17-hydroxy compounds of claim 1 which comprises subjecting a 3-oxygenated - 16β - methyl - 17α - hydroperoxy-pregnane-20-one to the action of a strongly acidic medium.

12. A process for preparing the compounds of claim 1 which comprises subjecting a 3-oxygenated-16β-methyl-17α - hydroperoxy - pregnane-20-one to the action of a strong acid, followed by treatment of the thereby formed 16-dehydro and the 17-hydroxy compounds of claim 1 with an alkali in aqueous lower alkanol in an inert atmosphere.

13. A process according to claim 12 wherein the strongly acidic medium comprises a mineral acid in a water miscible, non-hydroxylic, organic solvent.

14. A process according to claim 13 wherein said mineral acid is perchloric acid and said water miscible non-hydroxylic, organic solvent is a member selected from the group dioxane and tetrahydrofuran.

15. A process according to claim 12 wherein the strongly acidic medium comprises acetic acid, isopropenyl acetate and a hydrocarbon sulfonic acid.

References Cited

UNITED STATES PATENTS

| | | | |
|---|---|---|---|
| 2,806,039 | 9/1957 | Murray et al. | 260—345.2 |
| 3,064,011 | 11/1962 | Knox | 260—345.2 |
| 3,362,964 | 1/1968 | Baran | 260—345.2 XR |
| 3,378,570 | 4/1968 | Baran | 260—345.2 |

HENRY R. JILES, Primary Examiner

U.S. Cl. X.R.

260—397.3, 397.4, 397.45, 999

PO-1050
(5/69)

UNITED STATES PATENT OFFICE
CERTIFICATE OF CORRECTION

Patent No. 3,467,677               Dated September 16, 1969

Inventor(s) John N. Gardner

It is certified that error appears in the above-identified patent and that said Letters Patent are hereby corrected as shown below:

Column 2, line 63, "oxa-5a-D-homo" should read ---oxa-5α-D-homo---. Column 3, line 4, "implicity" should read ---implicitly---. Column 7, line 21 and 22, "4,16-pregna-17α-methoxy-16β-methyl-17α-oxa-D-homo-5α-" should read ---4,16-pregnadiene-3,20-dione respectively---. Column 8, line 6, "c.=dioxane" should read ---C=1 dioxane---. Column 8, line 11, "material" should read ---materials---. Column 8, line 12, "product" should read ---products---. Column 11, line 2, "166°-177° C.$[\alpha]_D = 67°$" should read ---166°-177° $[\alpha]_D = -67°$---.

SIGNED AND
SEALED
APR 28 1970

(SEAL)
Attest:

Edward M. Fletcher, Jr.
Attesting Officer

WILLIAM E. SCHUYLER, JR.
Commissioner of Patents